United States Patent
Taylor (10) Patent No.: US 12,495,779 B2
(45) Date of Patent: Dec. 16, 2025

(54) FISHING LURE

(71) Applicant: Suede Taylors, San Antonio, TX (US)

(72) Inventor: Michael Maurice Taylor, San Antonio, TX (US)

(73) Assignee: Suede Taylors, San Antonio, TX (US)

( * ) Notice: Subject to any disclaimer, the term of this patent is extended or adjusted under 35 U.S.C. 154(b) by 0 days.

(21) Appl. No.: 18/898,299

(22) Filed: Sep. 26, 2024

(65) Prior Publication Data

US 2025/0280807 A1    Sep. 11, 2025

Related U.S. Application Data

(63) Continuation-in-part of application No. 29/931,204, filed on Mar. 5, 2024.

(51) Int. Cl.
*A01K 85/18* (2006.01)
*A01K 85/01* (2006.01)

(52) U.S. Cl.
CPC ............ *A01K 85/018* (2022.02); *A01K 85/18* (2013.01)

(58) Field of Classification Search
CPC .................................... A01K 85/018
USPC ........................................ 43/42.06
See application file for complete search history.

(56) References Cited

U.S. PATENT DOCUMENTS

| | | | |
|---|---|---|---|
| 2,627,136 A * | 2/1953 | Sinclair | A01K 85/16 43/42.47 |
| 3,423,868 A * | 1/1969 | Le Master | A01K 85/18 43/42.35 |
| 3,708,903 A * | 1/1973 | Bercz | A01K 85/01 43/42.46 |
| 3,854,234 A | 12/1974 | Hardin | |
| 3,953,934 A | 5/1976 | Visser | |
| 4,176,490 A * | 12/1979 | Philips | A01K 85/18 43/42.35 |
| 4,610,103 A * | 9/1986 | Steinman | A01K 85/01 D22/133 |
| 4,736,542 A | 4/1988 | Floyd | |
| 6,035,574 A * | 3/2000 | Ware | A01K 85/01 43/42.31 |
| 6,546,663 B1 | 4/2003 | Signitzer et al. | |
| 6,922,937 B1 * | 8/2005 | Gilbert | A01K 85/01 43/44.99 |
| 6,993,866 B1 * | 2/2006 | Strange | A01K 85/12 43/42.31 |
| 8,745,915 B2 * | 6/2014 | McManigal | A01K 85/01 43/42.31 |
| 10,219,496 B2 * | 3/2019 | Gierlich | B29C 41/42 |
| 10,327,428 B2 * | 6/2019 | Shirakawa | A01K 85/00 |
| 10,881,088 B2 * | 1/2021 | Ruboyianes | A01K 85/12 |
| 10,932,458 B2 * | 3/2021 | Manty | A01K 85/00 |
| 11,399,524 B2 * | 8/2022 | Caldeira | A01K 85/128 |
| 12,102,072 B1 * | 10/2024 | English | A01K 85/028 |
| 2007/0124986 A1 * | 6/2007 | Boozer | A01K 91/06 43/44.99 |
| 2007/0163165 A1 * | 7/2007 | Castro | A01K 85/00 43/42.34 |

(Continued)

*Primary Examiner* — Christopher P Ellis (57) ABSTRACT

A fishing lure designed with an internal cavity filled with a scented material and an odor release hole. The fishing lure mimics a fish, with a tail and head that move in a swimming motion. As the fishing lure moves through the water, the scent is gradually released, creating a continuous odor trail that attracts fish.

20 Claims, 11 Drawing Sheets

(56) References Cited

U.S. PATENT DOCUMENTS

| | | | | |
|---|---|---|---|---|
| 2011/0010983 A1* | 1/2011 | Briccetti | ............... | A01K 85/01 |
| | | | | 43/42.22 |
| 2014/0259866 A1* | 9/2014 | Jones | ................... | A01K 91/06 |
| | | | | 43/42.06 |
| 2023/0210098 A1* | 7/2023 | Phillips | ............... | A01K 85/018 |
| | | | | 43/42.06 |

* cited by examiner

FISHING LURE

FIELD OF THE INVENTION

The present invention relates generally to fishing. More specifically, the present invention is an odor releasing fishing lure.

BACKGROUND OF THE INVENTION

Fishing is an ancient practice that involves the capture of fish using various techniques and tools. Over the centuries, fishing methods have evolved, with modern anglers employing sophisticated equipment to increase the efficiency and success of their efforts. One critical tool in fishing is the lure, which is designed to attract fish and simulate the appearance and movement of prey or bait. Lures come in various forms, including spoons, jigs, spinners, and soft plastics, and their purpose is to mimic the behavior of live bait in the water, enticing fish to strike.

A fishing lure generally relies on visual stimuli and movement to attract fish. Some modern lures incorporate noise-making features or reflective materials to further enhance their effectiveness. However, one essential aspect of natural bait that remains difficult to replicate in artificial lures is scent. Fish, particularly species like bass, trout, and catfish, often rely on their sense of smell to locate and identify prey. Natural bait, such as worms, minnows, or insects, release odors that fish associate with food, prompting them to strike. Artificial lures, while effective in replicating the appearance and movement of prey, generally lack the ability to release a scent that mimics natural bait. As a result, the absence of scent in artificial lures can reduce their effectiveness, particularly in situations where fish are not actively hunting by sight or sound.

Several attempts have been made to address the lack of scent in artificial lures. In some prior art, scented attractants are manually applied to the exterior of lures before casting, but these attractants tend to wash off quickly, particularly after repeated casts or exposure to water. This results in the need for frequent reapplication, which is inconvenient for anglers and interrupts the fishing experience. Other artificial lures are constructed from materials infused with scents, which release the odor over time. However, these lures often degrade quickly, losing their scent as the material wears down or becomes less effective after extended use. Additionally, the scent release from these lures is not always controlled or consistent, leading to either too little or too much odor being emitted at different points during use.

The problems with the prior art can be summarized as follows: First, the manual application of scent to lures is inefficient and temporary, often requiring anglers to pause their fishing activity to reapply attractants. Second, lures infused with scent material degrade over time, losing their effectiveness and requiring replacement. Third, the inconsistent or uncontrollable release of scent from existing solutions limits their overall effectiveness. These issues demonstrate a clear gap in the current state of artificial lure technology, where a controlled and continuous release of scent is highly desired but remains underdeveloped.

The objectives of the prior art have typically focused on replicating the appearance and movement of natural prey, while scent has been a secondary consideration. Although efforts have been made to incorporate scent into artificial lures, these attempts have failed to provide a solution that offers both durability and consistency in scent release.

The present invention addresses the shortcomings of the prior art by providing a fishing lure that not only replicates the appearance and movement of natural bait but also incorporates a controlled and continuous release of scent. The present invention is a fishing lure resembling a fish or other bait animal, equipped with an internal cavity and an odor release hole. In the preferred embodiment, the cavity is filled with a scented material that mimics the odor of natural bait, attracting fish through their sense of smell. As the lure moves through the water, the scent is gradually released through the odor release hole, creating a continuous scent trail that lures fish toward the bait.

By incorporating an internal cavity and odor release hole, the present invention overcomes the problem of scent washing off quickly, as experienced with manually applied attractants. Unlike lures infused with scent, the present invention allows for a more controlled and prolonged release of the scent, ensuring the lure remains effective for longer periods of time. The design of the present invention also prevents premature degradation of the lure, allowing it to maintain its structural integrity and effectiveness throughout extended fishing sessions.

In conclusion, the present invention represents a significant advancement in the field of fishing lures by offering a solution that addresses the key issues of durability, scent consistency, and ease of use. The continuous release of scent from the internal cavity provides anglers with a more effective tool for attracting fish, improving their chances of success while reducing the need for constant reapplication of scented attractants.

DETAIL DESCRIPTIONS OF THE INVENTION

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a fishing lure 1, embodiments of the present disclosure are not limited to use only in this context.

Figure 1:
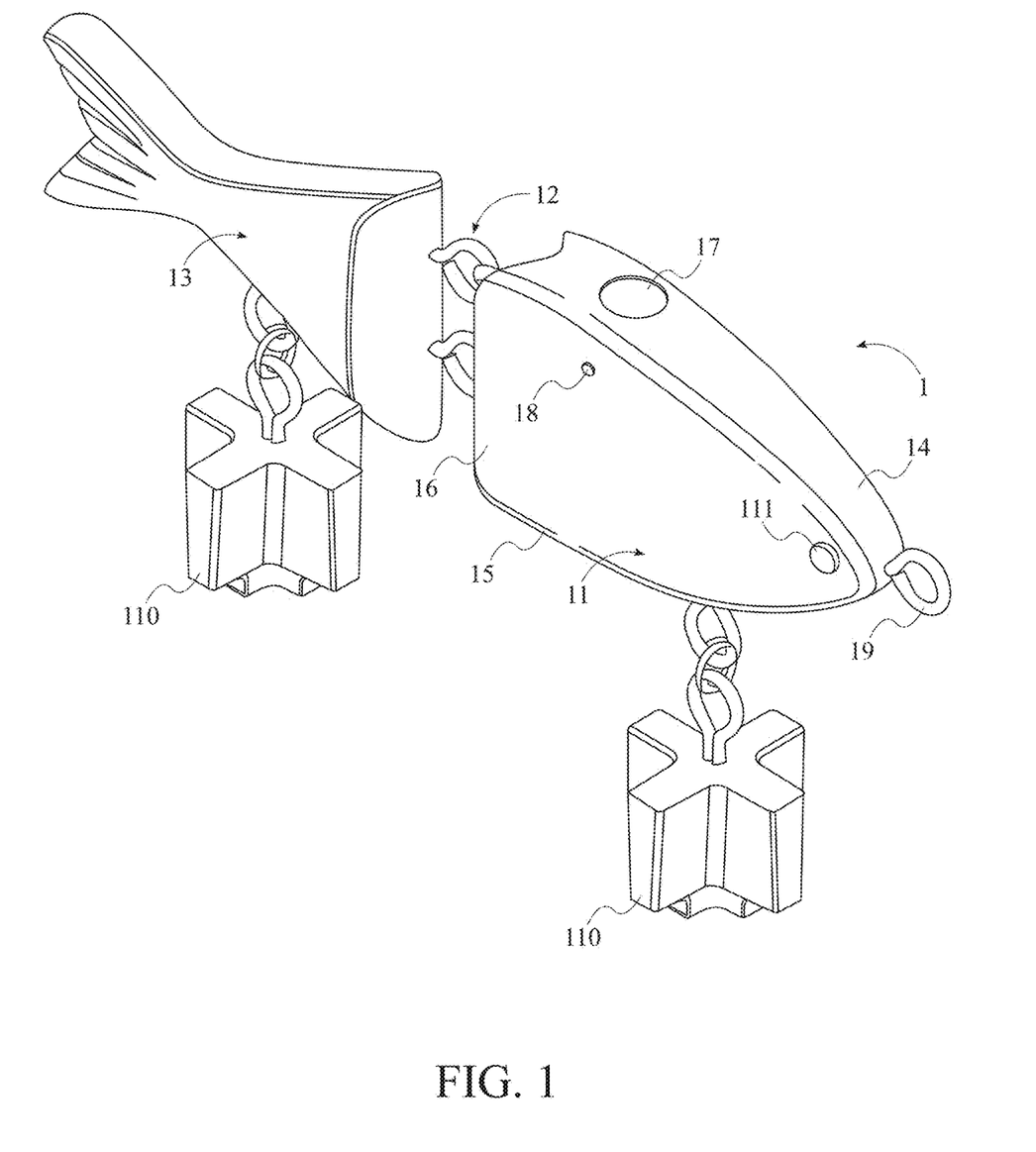
FIG. 1 is a perspective view of the present invention.

As shown in FIG. 1, the present invention is a fishing lure 1 comprising a packing hole 17 and an at least one odor release hole 18 wherein the packing hole 17 is a cavity extruded into the fishing lure 1. In the context of the present invention, the at least one odor release hole 18 is a through hole traversing outwardly from the packing hole 17 through the fishing lure 1.

Furthermore, as shown in FIG. 1, in the context of the present invention, the fishing lure further comprises a top surface 14, a bottom surface 15, and a plurality of lateral surfaces 16. In the context of the present invention, the top surface 14 is the top-most outwardly facing surface of the fishing lure 1. Likewise, in the context of the present invention, the bottom surface 15 is the bottom-most outwardly facing surface of the fishing lure 1. Further, in the context of the present invention, the plurality of lateral sides 16, in the preferred embodiment comprising two lateral sides (shown in FIG. 4 and FIG. 6), are opposing sides of the fishing lure (left and right sides). Additionally, in the preferred embodiment of the present invention, the top surface 14, the bottom surface 15, and the lateral sides 16 are configured in a manner that are depictive of a fish. Furthermore, as shown in FIG. 1, the present invention further comprises a plurality of eyelets 19 wherein said plurality of eyelets 19 are positioned about the fishing lure 1, enabling the connection of an at least one hook 110 and a fishing line.

In the preferred embodiment of the present invention, the fishing lure further comprises a head 11, a trunk 12, and a tail 13, as shown in FIG. 1, wherein the head 11 composes a forward-most portion of the fishing lure 1, the tail 13 composes the rearward-most portion of the fishing lure 1, and the trunk 12 is interposed between the head 11 and the tail 13. In some embodiments of the present invention, the trunk 12 is configured to permit differing movement between the head 11 and the tail 13. In the preferred embodiment of the present invention, the movement is similar to a fish's swimming motion.

Figure 2:
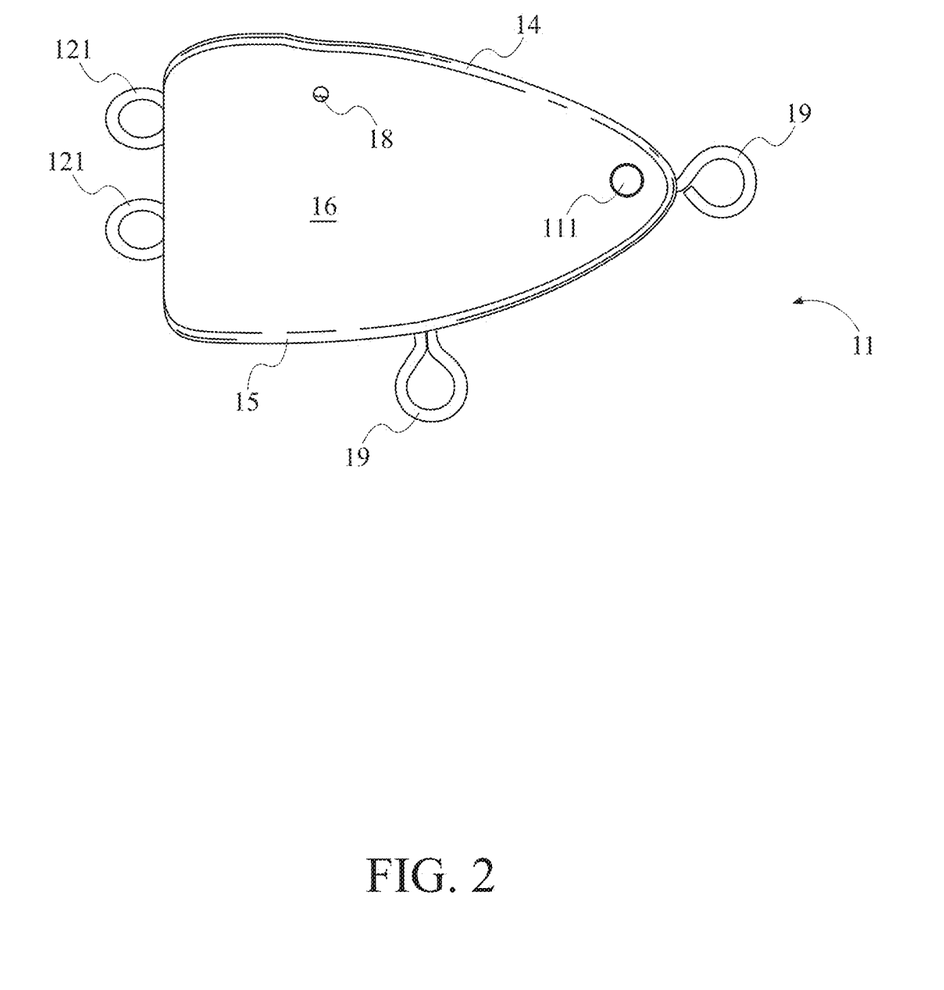
FIG. 2 is a side view of the head of the present invention.

As shown in FIG. 2, in the preferred embodiment of the present invention, the head 11 of the fishing lure 1 comprises at least one of the plurality of eyelets 19. In the preferred embodiment of the present invention, one eyelet is configured at the forward-most portion of the head 1. In such an embodiment, the fishing line is attached to the forward-most eyelet of the head 11 and used to pull the fishing lure 1 through the water, mimicking a fish swimming through water. Additionally, in the preferred embodiment, an eyelet is attached to the bottom surface 15 of the fishing lure 1, enabling attachment of the at least one hook 110. In some embodiments of the present invention, the head 11 comprises a decorative element 111. In the context of the present invention, a decorative element 111 is an element intended to depict portions of a fish such as an eye, gills, fins, and other ornamental characteristics of a fish.

Figure 3:
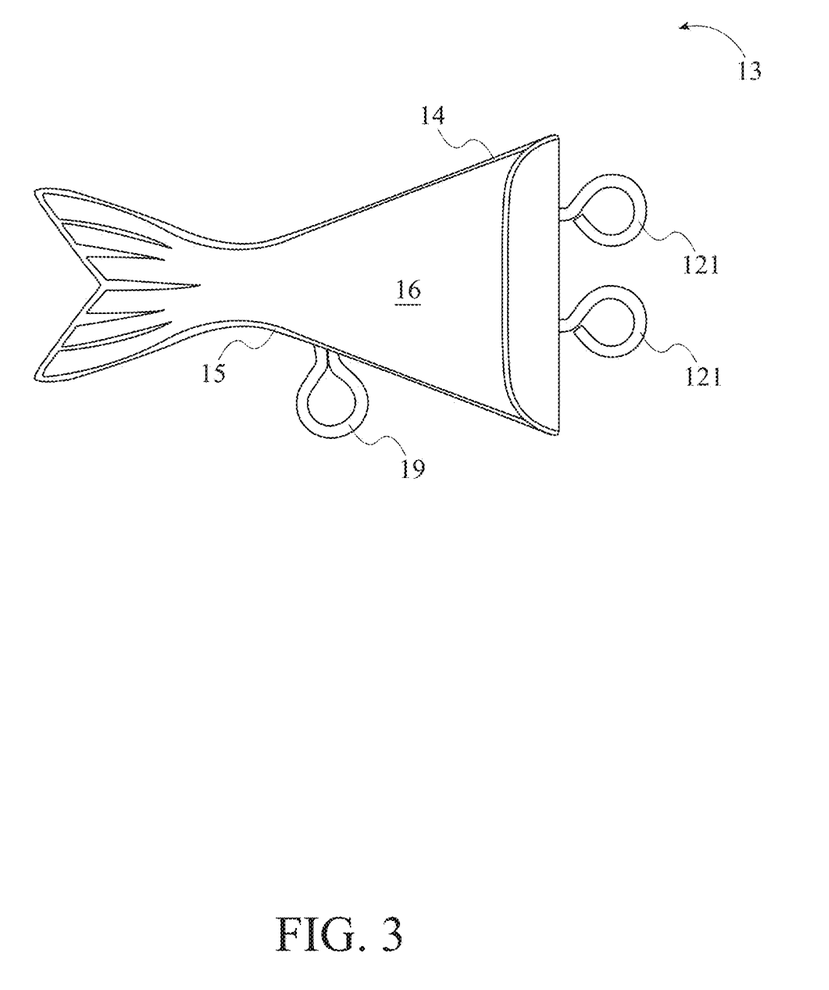
FIG. 3 is a side view of the tail of the present invention.

As shown in FIG. 3, in the preferred embodiment of the present invention, the tail 13 comprises at least one of the plurality of eyelets 19, wherein said eyelet is positioned on the bottom surface of the fishing lure 1. In the preferred embodiment of the present invention, the tail 13 of the present invention is depictive of a fish tail.

Figure 4:
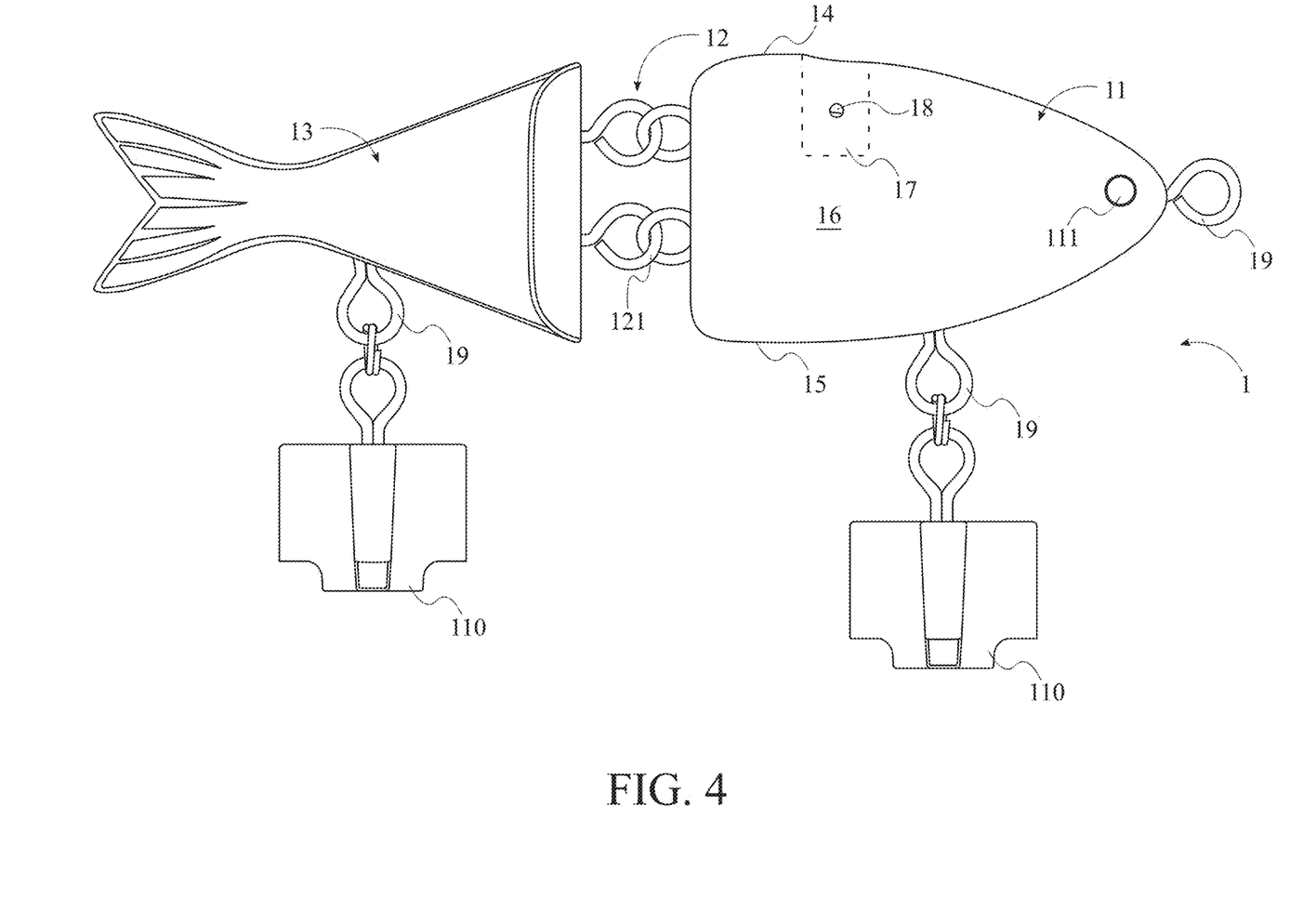
FIG. 4 is a right-side view of the present invention.

In the preferred embodiment of the present invention, as shown in FIG. 2, FIG. 3, and FIG. 4, is composed of a plurality of interlocking eyelets 19. In such embodiments as shown in FIG. 2 and FIG. 3, a rear most portion of the head 11 and the front-most portion of the tail 13, each comprise an eyelet 121, wherein said eyelets 121 are coupled together, as shown in FIG. 4, to compose the trunk 12. In the preferred embodiment of the present invention, the eyelets 121 are configured in a manner as to allow unimpeded movement between the head 11 and the tail 13 of the present invention.

Figure 5:
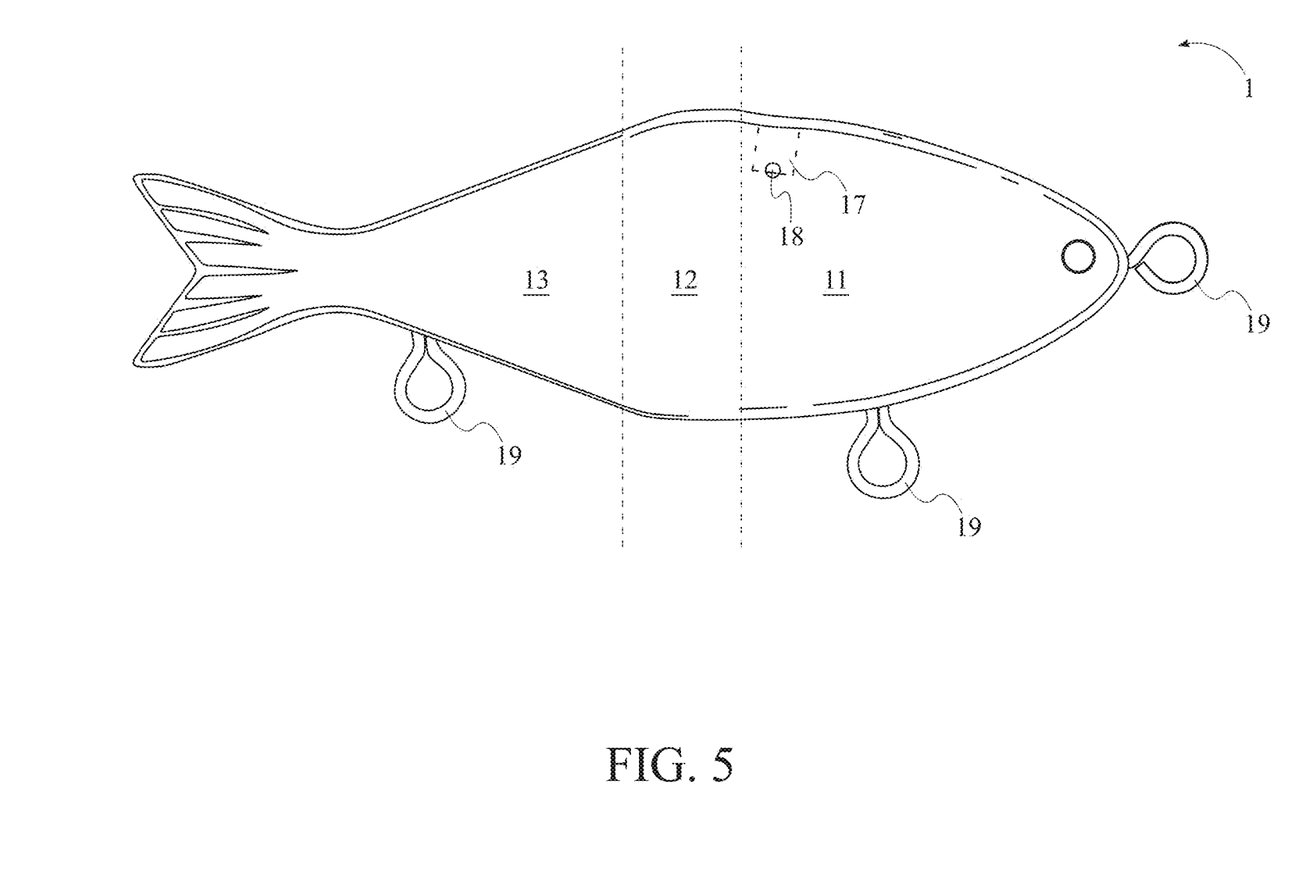
FIG. 5 is a right side view of an alternate embodiment of the present invention.

In some embodiments of the present invention, as shown in FIG. 5, the head 11, the trunk 12, and the tail 13 are composed of a solid member. In such an embodiment, the trunk 12 is rigid, thereby securing the head 11 and tail 13 together in a manner that moves both members 11,13 simultaneously.

Figure 6:
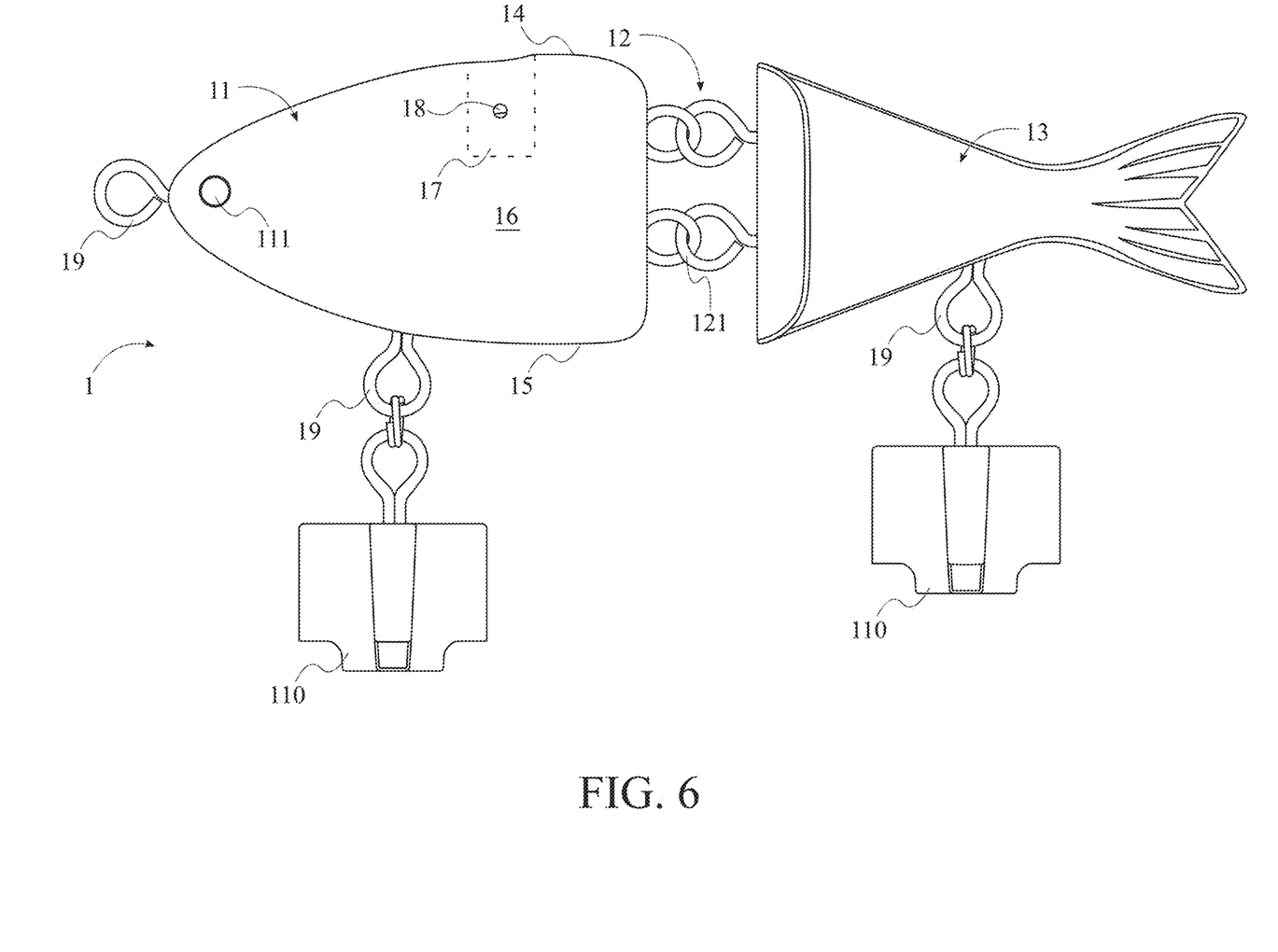
FIG. 6 is a left-side view of the present invention.
Figure 7:
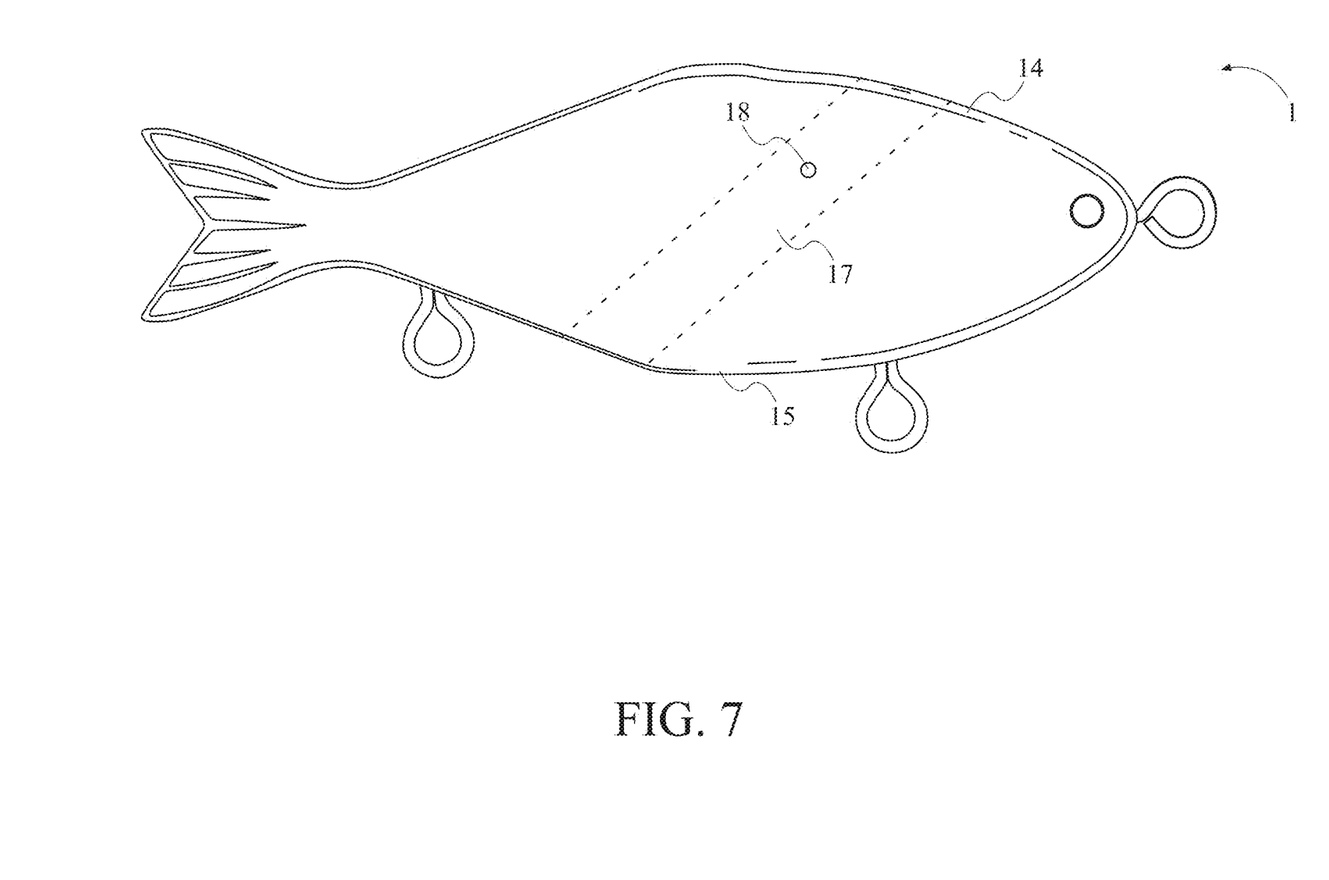
FIG. 7 is a right-side view of an alternate embodiment of the present invention.
Figure 8:
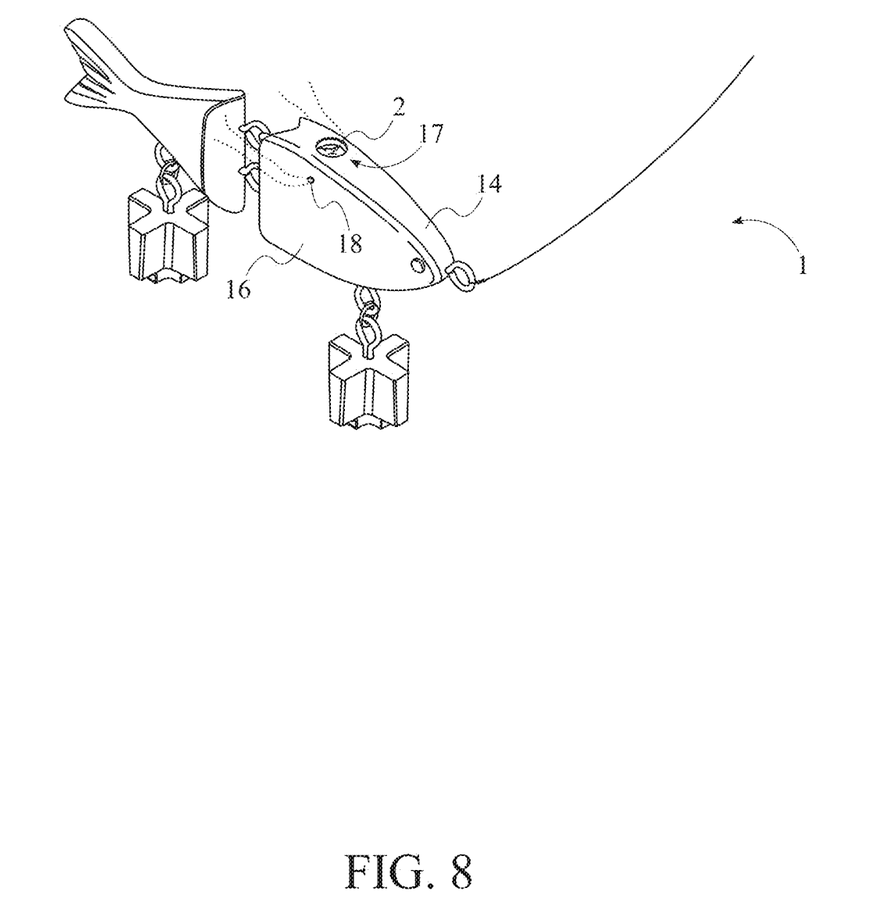
FIG. 8 is a perspective view of the present invention.
Figure 9:
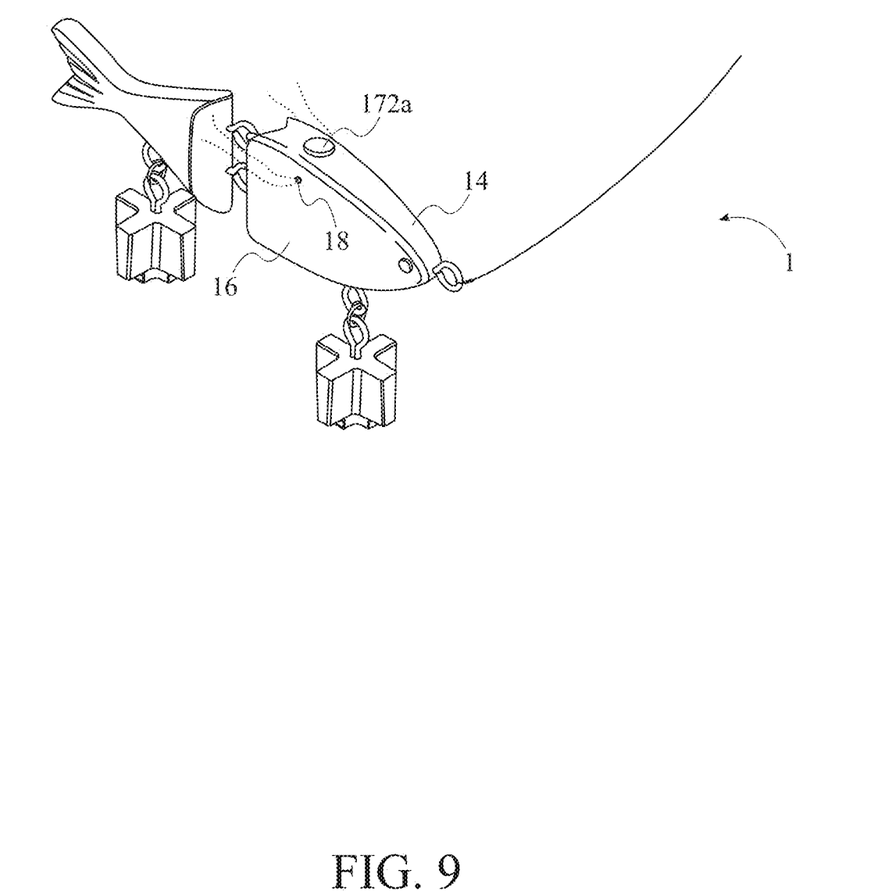
FIG. 9 is a perspective view of an alternate embodiment of the present invention.
Figure 10:
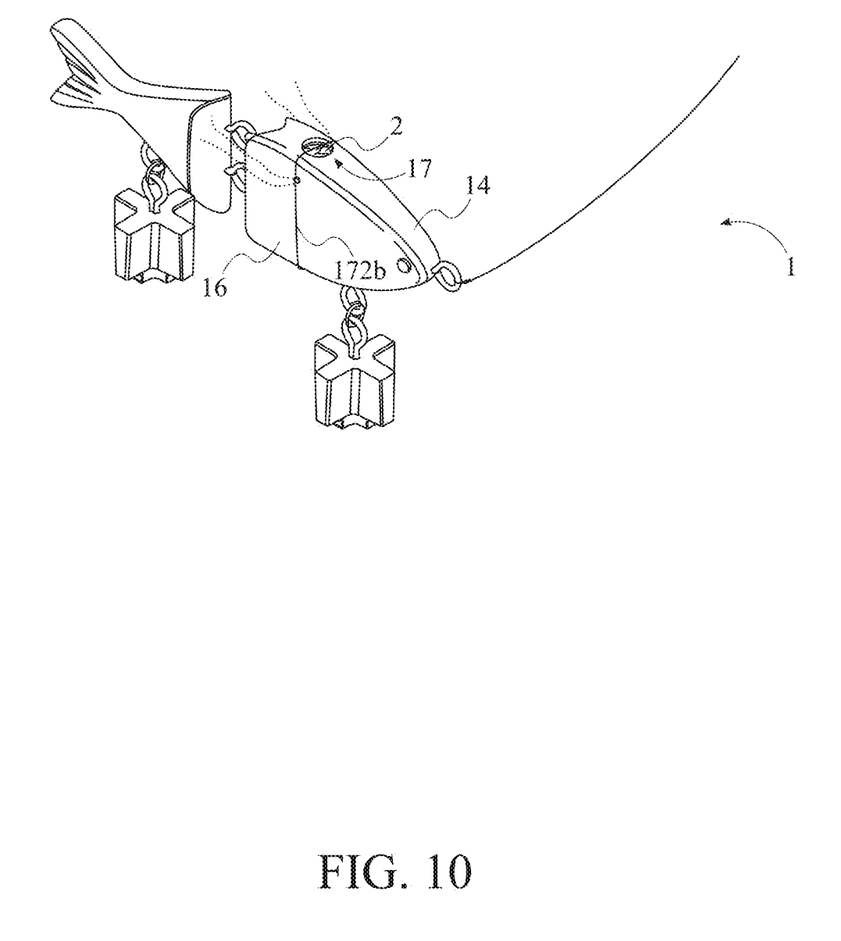
FIG. 10 is a perspective view of an alternate embodiment of the present invention.
Figure 11:
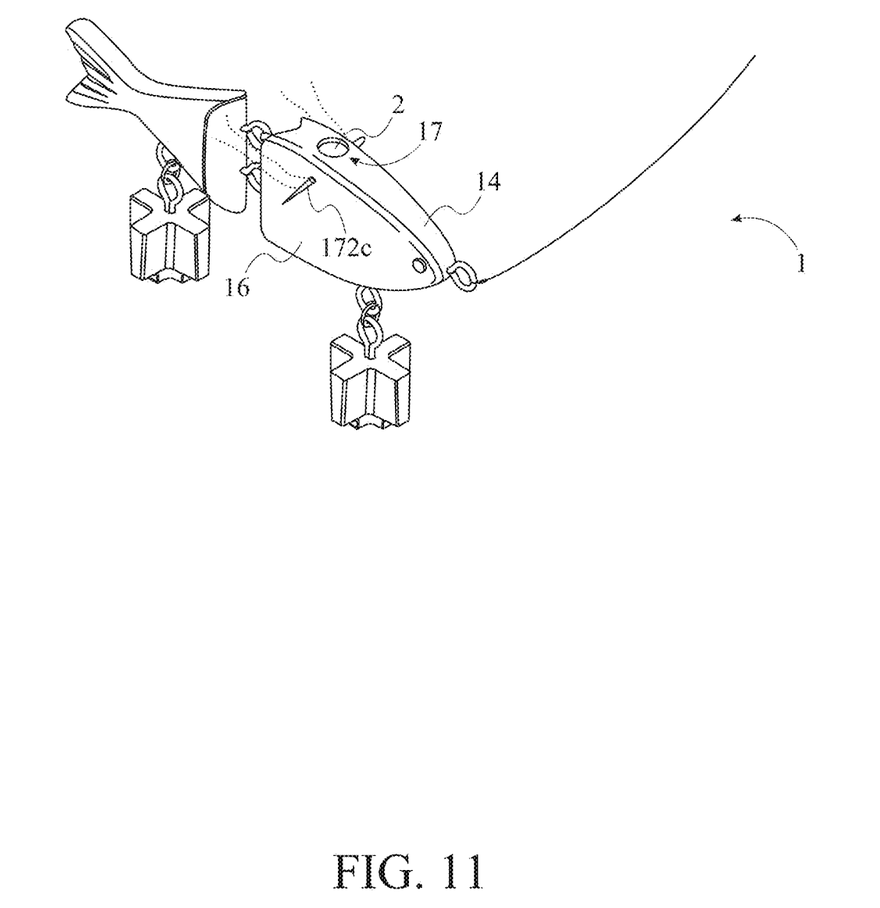
FIG. 11 is a perspective view of an alternate embodiment of the present invention.

In the preferred embodiment of the present invention, the packing hole 17 is a cavity traversing from the top surface 14 into the fishing lure 1. As shown in FIG. 6, in some embodiments of the present invention, the packing hole 17 traverses the head 11 of the present invention from the top surface 14, wherein the at least one odor release hole 18 traverses a lateral surface 16 of the head 11 into the packing hole 17. In the preferred embodiment of the present invention, the at least one odor release hole 18, comprises two odor release holes 18, wherein each odor release hole 18 traverses into the packing hole 17 from each lateral side (as shown in FIG. 4 and FIG. 6). In some embodiments of the present invention, the packing hole 17 traverses the fishing lure 1 from the top surface 14 through the bottom surface 15, as shown in FIG. 7. In the context of the present invention, the packing hole 17 provides an upward force to an odorous material 2 thereby preventing the odorous material 2 from falling out. In embodiments wherein the packing hole traverses a portion of the fishing lure 1, the upward force (reaction force) is provided by a bottom-most portion of the packing hole 17. In an embodiment of the present invention wherein the packing hole 17 traverses the fishing lure 1 from the top surface 14 to the bottom surface 15, the packing hole is angled, thereby providing an upward reaction force to the odorous material 2, preventing the odorous material 2 from falling through the packing hole 17.

In the preferred embodiment of the present invention, as shown in FIG. 8, FIG. 9, FIG. 10, and FIG. 11, the fishing lure 1 further comprises an odorous material 2 wherein said odorous material 2 is interposed into the packing hole 17. In the context of the present invention, an odorous material 2 is a material that releases a fish attracting scent. In the context of the present invention, a fish attracting scent is an odor resembling worms, fish liver, fish, and other scents possessed by baits known to those within the art. In the preferred embodiment of the present invention, as the fishing lure 1 maneuvers through water, particulate matter of odorous material 2, and thus an odor, are discarded through the at least one odor release hole 18. In some embodiments of the present invention, the fishing lure 1 further comprises a fastener wherein said fastener prevents the odorous material 2 from expelling through the packing hole 18. In some embodiments of the present invention, the fastener 172 is selected from a plug 172a, a band 172b, and a pin 172c. In an embodiment wherein the fastener is a plug 172a, the plug 172a is secured into the packing hole 17, thereby preventing the odorous material 2 from expelling through the packing hole 17. Likewise, in embodiments wherein the fastener 172 is a band 172b, the band 172b is positioned around the fishing lure 1, traversing the packing hole 17, thereby securing the odorous material 2 within the packing hole 17. Lastly, in embodiments wherein the fastener is a pin 172c, the pin 172c is inserted through the odor release holes 18, piercing the odorous material 2, and securing said odorous material 2 within the packing hole 17.

Although the invention has been explained in relation to its preferred embodiment, it is to be understood that many other possible modifications and variations can be made without departing from the spirit and scope of the invention.

What is claimed is:

1. A fishing lure comprising:
   a top surface;
   a plurality of lateral sides;
   a packing hole; and
   an at least one odor release hole;
   wherein:
      the top surface is the top-most outwardly surface of the fishing lure;
      the packing hole traverses at least a portion of the fishing lure from the top surface; and
      the at least one odor release hole traverses at least one of the lateral sides into the packing hole.

2. The fishing lure, as claimed in claim 1 wherein the packing hole further comprises an odorous material.

3. The fishing lure, as claimed in claim 2 wherein the fishing lure resembles a fish comprising:
   a head;
   a trunk; and
   a tail;
   wherein:
      the head composes the front-most portion of the fishing lure;
      the tail composes the rear-most portion of the fishing lure; and
      the trunk is interposed between the head and the tail.

4. The fishing lure, as claimed in claim 3, wherein the trunk comprises a plurality of eyelets wherein:
   at least one of the plurality of eyelets are coupled to a rear-most portion of the head;
   at least one of the plurality of eyelets are coupled to the front-most portion of the tail; and
   the at least one eyelet of the head and the at least one eyelet of the tail are interlocked together, thus composing the trunk.

5. The fishing lure, as claimed in claim 2, wherein the packing hole further comprises a plug, wherein said plug is inserted into the packing hole, thereby preventing the odorous material from expelling through the packing hole.

6. The fishing lure, as claimed in claim 2, wherein the packing hole further comprises a band wherein said band is configured around the fishing lure, covering the packing hole, thereby preventing the odorous material from expelling through the packing hole.

7. The fishing lure, as claimed in claim 2, wherein a pin traverses the lateral sides of the fishing lure through the scent release holes and piercing the odorous material, thereby preventing the odorous material from expelling through the packing hole.

8. The fishing lure, as claimed in claim 3, wherein the bottom surface an a front most portion of the head, each comprise an eyelet.

9. The fishing lure, as claimed in claim 8, wherein the eyelet of the bottom surface comprises a hook.

10. The fishing lure, as claimed in claim 2, wherein particulate matter of the odorous material is released through the at least one odor release hole.

11. The fishing lure, as claimed in claim 3, further comprising a bottom surface;
the bottom surface being opposite the top surface; and
the packing hole traversing from the top surface through the bottom surface.

12. A fishing lure comprising:
a top surface;
a plurality of lateral sides; and
an at least one odor release hole;
wherein:
the fishing lure resembles a fish comprising a head, a trunk, and a tail;
the head composes the front-most portion of the fishing lure;
the tail composes the rear-most portion of the fishing lure;
the trunk is interposed between the head and the tail;
the top surface is the top-most outwardly surface of the fishing lure;
the at least one odor release hole traverses at least one of the lateral sides.

13. The fishing lure, as claimed in claim 12, wherein the trunk comprises a plurality of eyelets wherein:
at least one of the plurality of eyelets are coupled to a rear-most portion of the head;
at least one of the plurality of eyelets are coupled to the front-most portion of the tail; and
the at least one eyelet of the head and the at least one eyelet of the tail are interlocked together, thus composing the trunk.

14. The fishing lure, as claimed in claim 13, further comprising a packing hole;
wherein the packing hole traverses into a portion of the fishing lure from the top surface.

15. The fishing lure, as claimed in claim 14, wherein the packing hole comprises an odorous material; wherein particulate matter from the odorous material is expelled through the at least one odor release hole.

16. The fishing lure, as claimed in claim 15 wherein the odorous material is prevented from expelling through the packing hole by a fastener selected from the following consisting of: a plug; a band; and a pin.

17. The fishing lure, as claimed in claim 16, further comprising:
a plurality of eyelets; and
an at least one hook;
wherein:
at least one eyelet of the plurality of eyelets is attached to a bottom surface of the fishing lure;
the bottom surface of the fishing lure being opposite the top surface;
the at least one hook coupling to the at least one eyelet on the bottom surface.

18. A fishing lure comprising:
a plurality of lateral sides;
an at least one odor release hole; and
a packing hole;
wherein:
the fishing lure resembles a fish comprising a head, a trunk, and a tail;
the head composes the front-most portion of the fishing lure;
the tail composes the rear-most portion of the fishing lure;
the trunk is interposed between the head and the tail;
the trunk comprises a plurality of eyelets wherein:
at least one of the plurality of eyelets are coupled to a rear-most portion of the head;
at least one of the plurality of eyelets are coupled to the front-most portion of the tail; and
the at least one eyelet of the head and the at least one eyelet of the tail are interlocked together, thus composing the trunk;
the at least one odor release hole traverses at least one of the lateral sides into the packing hole.

19. The fishing lure, as claimed in claim 18 wherein:
the packing hole further comprising an odorous material;
the odorous material is prevented from expelling through the packing hole by a fastener selected from the following consisting of: a plug; a band; and a pin.

20. The fishing lure, as claimed in claim 18, wherein particulate matter of the odorous material is expelled from the packing hole through the at least one odor release hole.

* * * * *